No. 698,725. Patented Apr. 29, 1902.
H. T. MYERS.
COOLING TUB.
(Application filed July 16, 1901.)
(No Model.)
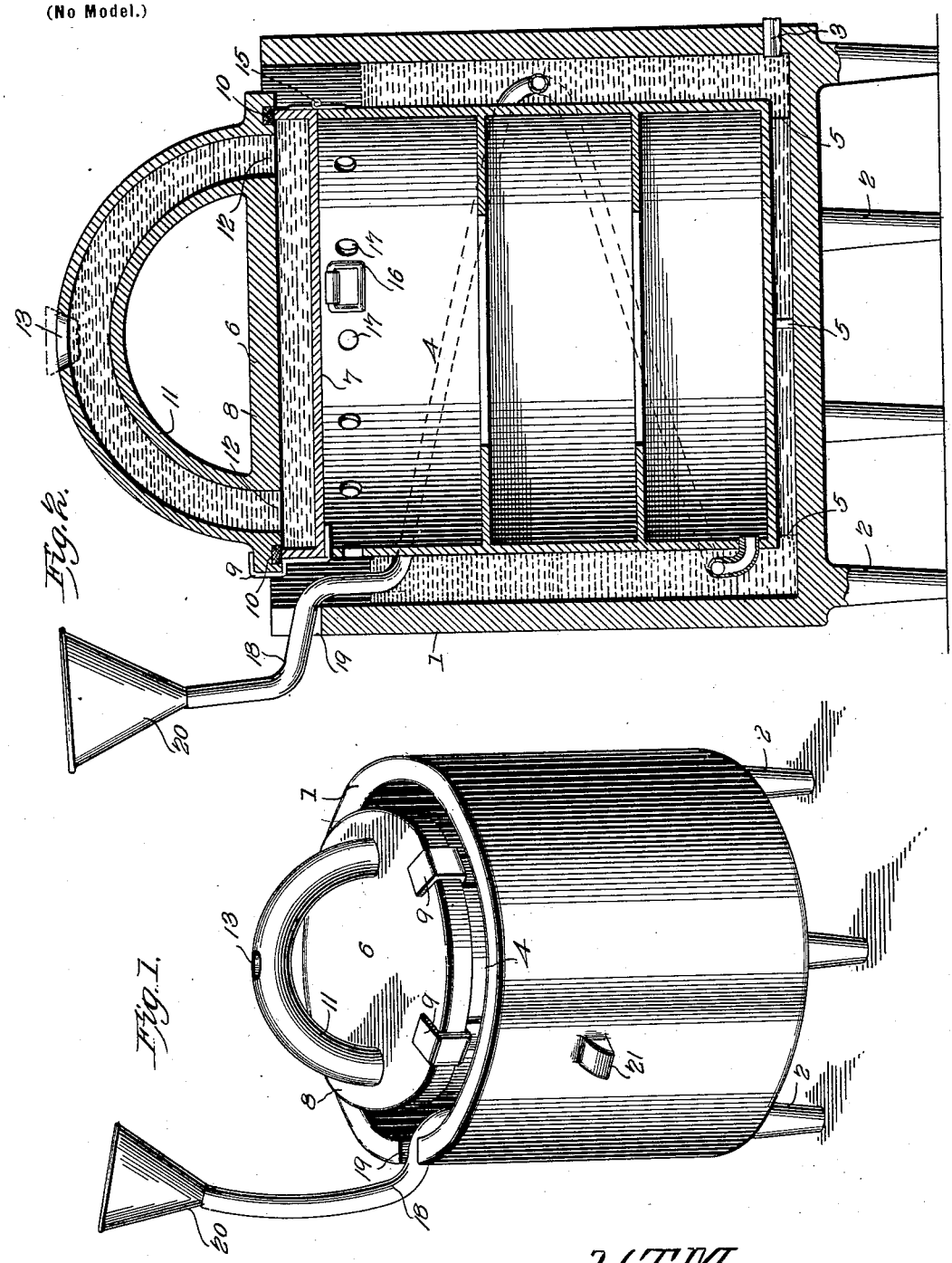

UNITED STATES PATENT OFFICE.

HELEN T. MYERS, OF COLORADO SPRINGS, COLORADO.

COOLING-TUB.

SPECIFICATION forming part of Letters Patent No. 698,725, dated April 29, 1902.

Application filed July 16, 1901. Serial No. 68,541. (No model.)

*To all whom it may concern:*

Be it known that I, HELEN T. MYERS, a citizen of the United States, residing at Colorado Springs, in the county of El Paso and State of Colorado, have invented a new and useful Cooling-Tub, of which the following is a specification.

This invention relates to cooling-tubs for reducing the temperature of articles of food, milk, and the like for the purpose of preserving the same; and the object of the same is to provide a device or organization of elements based on the law of evaporation and as manifested in the Mexican olla or water-cooler and which rely upon the use of a porous or sweating inclosure or jar to cool the water therein by surface evaporation and to utilize this well-known operation to coöperate with an interiorly-located vessel of metal or non-porous material for containing foods, milk, or perishable articles to preserve the latter without the use of ice or other cooling instrumentalities, and thus produce a device which is adapted for use in very warm or tropical climates, where ice is not obtainable or is beyond the reach of limited means.

The invention consists in the construction and arrangement of the several parts, which will be more fully hereinafter described and claimed.

Figure 1 is a perspective view of cooling-tub embodying the features of the invention. Fig. 2 is a transverse vertical section of the tub on a larger scale.

Similar numerals of reference are employed to indicate corresponding parts in both views.

The numeral 1 designates an outer porous vessel which is open at the top and has lower supporting-legs 2 to permit the air to circulate under the bottom thereof. This vessel 1 may be of any suitable dimension and preferably circular in form, because said shape of porous vessel is more effective in the operation desired to ensue, a smooth exterior circular surface avoiding obstruction to air-currents around the vessel, and thereby accelerating evaporation. This shape is also preferred for the accommodation of the ventilator, which will be hereinafter described, as well as to prevent the cooler being pushed into a corner, thus cutting off all circulation of air. The lower portion of the said vessel is provided with a drain-opening, in which a plug 3 is normally fitted.

Within the vessel 1 a metallic receptacle 4, preferably formed of zinc, is disposed and is of less diameter than said vessel, so as to provide an interspace between the receptacle and vessel for the introduction of water. The bottom of the receptacle 4 is provided with radially-arranged strips 5 to permit the presence of water thereunder, and at its top or upper end said receptacle has a lid or cover 6, comprising a metallic pan 7, which is adapted to rest directly on the upper edge of the receptacle, and a porous top plate 8, held in close relation to the pan 7 and in contact with the water contained in the latter by metallic edge clamps 9, the joint between the said parts being rendered water-tight by the introduction of a rubber or other gasket 10. The clamps are freely removable, so that the pan and plate may be separated at any time desired for cleansing or other purposes, and rising centrally from the plate is an arcuate tubular member 11, communicating with diametrically-disposed ports 12 in the plate and serving as a handle or grip for raising said cover, having an upper inlet 13 for supplying the pan with water, the said member when filled with water serving also as a reservoir for automatically replenishing the continual loss of water in the pan by evaporation. The inlet 13 of the member 11 is closed by a plug 14 or any other suitable device. The pan 7 is preferably hinged to the receptacle 4, as at 15, so as to easily gain access to said receptacle, and within the latter it is proposed to arrange suitable supports or racks for holding articles of food, milk, or other materials, and also upper drop-handles 16 to assist in removing the receptacle from the outer vessel. Around the upper portion of the receptacle are ventilating-apertures 17 to permit the escape of foul air from the receptacle, and connecting with the lower portion of the receptacle and passing through the water between the vessel 1 and the receptacle and wound about the latter is a flexible tube 18, which exits through a notch 19 in the upper edge of the vessel and is provided with a terminal funnel 20, which permits the fresh air to pass down into the receptacle and become thoroughly cooled before entering the latter. For convenience in handling the vessel 1 it is provided with grips or handles 21.

In preparing the cooling-tub for use water is poured into the interspace between the receptacle 4 and the vessel 1 by the use of a funnel or other means, the water being caused to extend vertically a distance slightly below the apertures 17 in the receptacle. Water is also introduced into the arcuate member 11 and from the latter into the pan 7, the quantity poured into the said member being sufficient to replace the reduction of the water in the pan by evaporation, so that said porous plate covering the pan will be continually kept in contact with the water, the evaporation taking place through the plate 8. The water in the interspace between the receptacle and the vessel will be replenished from time to time, and the food or other articles placed within the receptacle will be cooled and preserved, and the exterior of the receptacle will also be ventilated to keep the food sweet and pure. It will be understood that the evaporation which will ensue at the top and bottom and around the sides of the vessel will cause the inclosed water and by conduction the interior of the receptacle to have such a low degree of temperature as to chill and preserve articles placed therein and will be of great benefit in cooling milk, meat, butter, and similar foods without the contaminating proximity of ice or other refrigerant, from which dampness and absortion might ensue.

The cooling-tub is applicable for many purposes, and the size thereof will be varied as may be desired.

Having thus described the invention, what is claimed is—

1. The combination with an outer porous vessel, a metallic receptacle of less diameter than said vessel mounted in the latter, and a lid or cover for the receptacle comprising a pan and a porous plate thereover, the latter having a tubular grip in communication therewith to serve as a water-feeding means therefor.

2. The combination with an outer porous vessel, a metallic receptacle of less diameter than said vessel mounted in the latter, the bottom of the vessel being elevated above its support and the bottom of the receptacle being held above the bottom of the vessel, water being introduced between the receptacle and vessel, a lid or cover for the receptacle comprising a water-pan and a porous plate removably attached thereto and having an arcuate tubular member rising therefrom to serve as a grip and means for supplying water to the pan, and means for supplying fresh air to the receptacle and cooling the air before entering the latter.

3. The combination of an outer porous vessel, a metallic receptacle of less diameter than said vessel and mounted in the latter, the bottom of the vessel being provided with legs, and the bottom of the receptacle being elevated above the bottom of the vessel, water being introduced in the interspace between the receptacle and vessel, and a lid or cover for the receptacle comprising a water-pan and a porous plate removably attached thereto and having an arcuate member rising therefrom to serve as a grip and as a means for supplying water to the pan.

In testimony that I claim the foregoing as my own I have hereto affixed my signature in the presence of two witnesses.

HELEN T. MYERS.

Witnesses:
B. M. HODGINS,
E. A. STETSON.